United States Patent
Kenyon (10) Patent No.: US 6,701,343 B1
(45) Date of Patent: Mar. 2, 2004

(54) SYSTEM AND METHOD FOR AUTOMATED WEB SITE CREATION AND ACCESS

(75) Inventor: Jeffrey D. Kenyon, Boulder, CO (US)

(73) Assignee: Qwest Communications International, Inc., Denver, CO (US)

(*) Notice: Subject to any disclaimer, the term of this patent is extended or adjusted under 35 U.S.C. 154(b) by 0 days.

(21) Appl. No.: 09/452,526

(22) Filed: Dec. 1, 1999

(51) Int. Cl.$^7$ ............................................. G06F 15/16
(52) U.S. Cl. ........................ 709/204; 709/217; 709/219; 709/205
(58) Field of Search ................................. 709/204, 205, 709/206, 201, 229, 217, 200, 203, 219; 707/9, 10, 204; 715/501.1

(56) References Cited

U.S. PATENT DOCUMENTS

| | | | | |
|---|---|---|---|---|
| 5,875,478 A | * | 2/1999 | Blumenau | 711/162 |
| 6,026,433 A | * | 2/2000 | D'Arlach et al. | 707/10 |
| 6,223,177 B1 | * | 4/2001 | Tatham et al. | 345/751 |
| 6,233,600 B1 | * | 5/2001 | Salas et al. | 709/201 |
| 6,240,444 B1 | * | 5/2001 | Fin et al. | 709/204 |
| 6,263,352 B1 | * | 7/2001 | Cohen | 715/513 |
| 6,308,188 B1 | * | 10/2001 | Bernardo et al. | 715/530 |
| 6,397,256 B1 | * | 5/2002 | Chan et al. | 709/204 |
| 6,505,212 B2 | * | 1/2003 | Nakano et al. | 707/200 |

OTHER PUBLICATIONS

Lotus Brings QuickPlace to Market; http://www.lotus.com/lotus/press.n...d71188525676100475l7b?OpenDocument/ Jul. 30, 1999.

* cited by examiner

Primary Examiner—Zarni Maung
Assistant Examiner—Mareisha N. Winters
(74) Attorney, Agent, or Firm—Marsh Fischmann & Breyfogle LLP (57) ABSTRACT

A community of practice server provides system users who establish connections over a data network with the functionality to either create a community of practice web page, view and access existing web pages, or to activate web sites which have been archived. If the system user chooses to create a new website, an interactive display graphic may be provided through which the system user may enter selected information. Once this information has been completed, a template may be accessed from memory and this information used to populate the template. Once this is complete, a predetermined number of links may be provided on the web page to predetermined destinations. The web sites which are created are accessible and updateable by any number of system users who are granted access to it.

20 Claims, 10 Drawing Sheets

COMMUNITY NAME — 42

DESCRIPTION — 44

WWW HOME — 46

NAME | PRIMARY CONTACT — 48 | E-MAIL — 50 | PHONE — 52

MEMBERS — 54

ENTER    CANCEL

| ACTIVE WEBSITES | |
|---|---|
| GROUP | CREATED |
| SOFTWARE ENGINEERS | 10/15/99 |
| HARDWARE ENGINEERS | 10/01/99 |
| SOFTWARE PROGRAMMERS | 9/01/99 |
| LAB TECHNICIANS | 9/01/99 |
| INFORMATION SERVICES | 8/15/99 |

ARCHIVED WEBSITES — 70

| GROUP | CREATED |
|---|---|
| MECHANICAL ENGINEERS | 10/15/97 |
| ACCOUNTING | 10/01/97 |
| MANUFACTURING | 9/15/99 |
| SECURITY | 9/01/99 |

FIG. 10

SYSTEM AND METHOD FOR AUTOMATED WEB SITE CREATION AND ACCESS

FIELD OF THE INVENTION

The invention described herein relates to a system and method for providing community web pages, and more particularly to a system and method for simplifying the generation of community practice web pages which are accessible and updateable by a number of parties.

BACKGROUND OF THE INVENTION

The dissemination of information has become an important priority for many businesses and organizations. As such, these organizations often look to many different types of business tools which may be employed to provide for access to, or routing of, information within the organization. One example of a business tool which provides better access to information, is an internal e-mail system. Through this system, parties may exchange electronic messages. One drawback of e-mail is that it is dependent upon one party taking the affirmative action to reply to messages received.

In addition to providing e-mail, companies may also find it advantageous to provide local repositories for information which may be of interest to a significant number of parties. In the past, this type of information may have been provided through use of a database. Parties seeking the information had to connect to the computer which contained the database and needed the necessary tools then in order to perform a search. In some situations, this could be a cumbersome and quite expensive process.

In more modem times, the Internet, as well as intranets and extranets, have become a more common medium for exchanging information either within the organization, or to locations outside. One tool used in particular with regards to providing access to selected information is the website. A website is a location on a data network, such as the World Wide Web (available via the Internet, an intranet, or extranet) which is accessible remotely and contains information which is viewable through a system user's personal computer. Links may be included on the home page, which provide access to other repositories of information. Web pages are individually created for particular purposes and access to a particular web page may be limited to selected parties.

SUMMARY OF THE INVENTION

The inventor has recognized that one of the disadvantages of using websites to disseminate information, is that they may be time consuming to create, and labor intensive to continually update. Further, posting information on a web page may be a slow process because in most cases a web master which provides an editing point for all information put on the web page. Still further, the inventor has recognized that when the obligation falls on one or two parties to provide for the updating of websites, many websites soon are out of date and merely create noise in the information space.

As such, the inventor has recognized that it would be advantageous to employ a method and system for the automated creation of community of practice websites. Through this automated process, a system user may enter a minimal amount of information and the system will create a website which is accessible and updateable by other members of the community of practice. Further, the website may be constructed in such a manner that after a predetermined period of non-use, it may be placed in an archive until revived at a selected point in time.

Described herein is a system which is connectable to the Internet, an intranet, or extranet, and provides for such functions as creating, viewing, and/or updating websites. The system may be resident on a server type device which has either open or limited access over a data network. Included in the system may be a number of interactive display graphics which are viewable over the data network and may be employed to initiate various automated functions of the system.

One display graphic which may be presented provides for the automatic creation of new web pages. The display graphic may include dialog boxes through which information to be included on the web page may be entered. A first memory may be provided to store this information entered. A second memory may be employed to store at least one website template which may be populated with the information stored in the first memory. Included in the templates may be a number of links to other web pages in the system. When a system user has completed entering the necessary information for creating a website, this information may be entered in the template and the website made available over the data network.

In one aspect of the invention, an additional interface may be provided through which currently active websites on a server may be accessed. The interface may include a listing of the currently active websites along with descriptive information. The display is configured such that a website on the listing may be selected and viewed.

In yet another aspect of the invention, the system may include another interface through which a system user may view websites which have been previously archived. The system is configured to present a listing of deactivated websites, and upon selection, reactivating a particular website.

In operation, a system user may access the server over a data network such as the Internet, or a company intranet or extranet. Once a system user has established a connection, a web page may be provided through which the system user may select a number of modes of operation. If the system user wishes to create a new website, an additional interface is provided through which the system user may enter textual information which is used to populate the website. The entered information may be stored in the first memory and a website template accessed from the second memory. A website may then be constructed using the information stored in the first memory.

The template employed to create the website may automatically include a number of hypertext links which link the newly created web page to other related web pages. These web pages may already exist or they may be web pages which are created during the same process. These linked web pages may include a discussion forum (also known as a bulletin board), a calendar, a document library, a page on which to catalog relevant hyperlinks to other WWW pages, or an automated process page through which a series of screen displays may be presented for performing a number of different functions. When the construction of the new web page is complete, the page is given a URL and made accessible over the data network.

The newly created website may be configured to provide for unlimited access over the network, or security features may be employed to limit access. Limited access can be integrated such that only system users with particular IP addresses may access or it may be password protected. The web page may be further configured such that its various areas and linked pages may be updated by all those who have access to the site. For example, if a discussion link is provided in the website, it may be selected and once that page is accessed, the system users may be involved through various message boards with discussions being carried on. Further, if there is a calendar page, the system user may access this page and perform any updates the user deems relevant. Finally, a system user when accessing the library link may either upload documents to the library or access documents which are currently stored therein.

DETAILED DESCRIPTION

Figure 1:
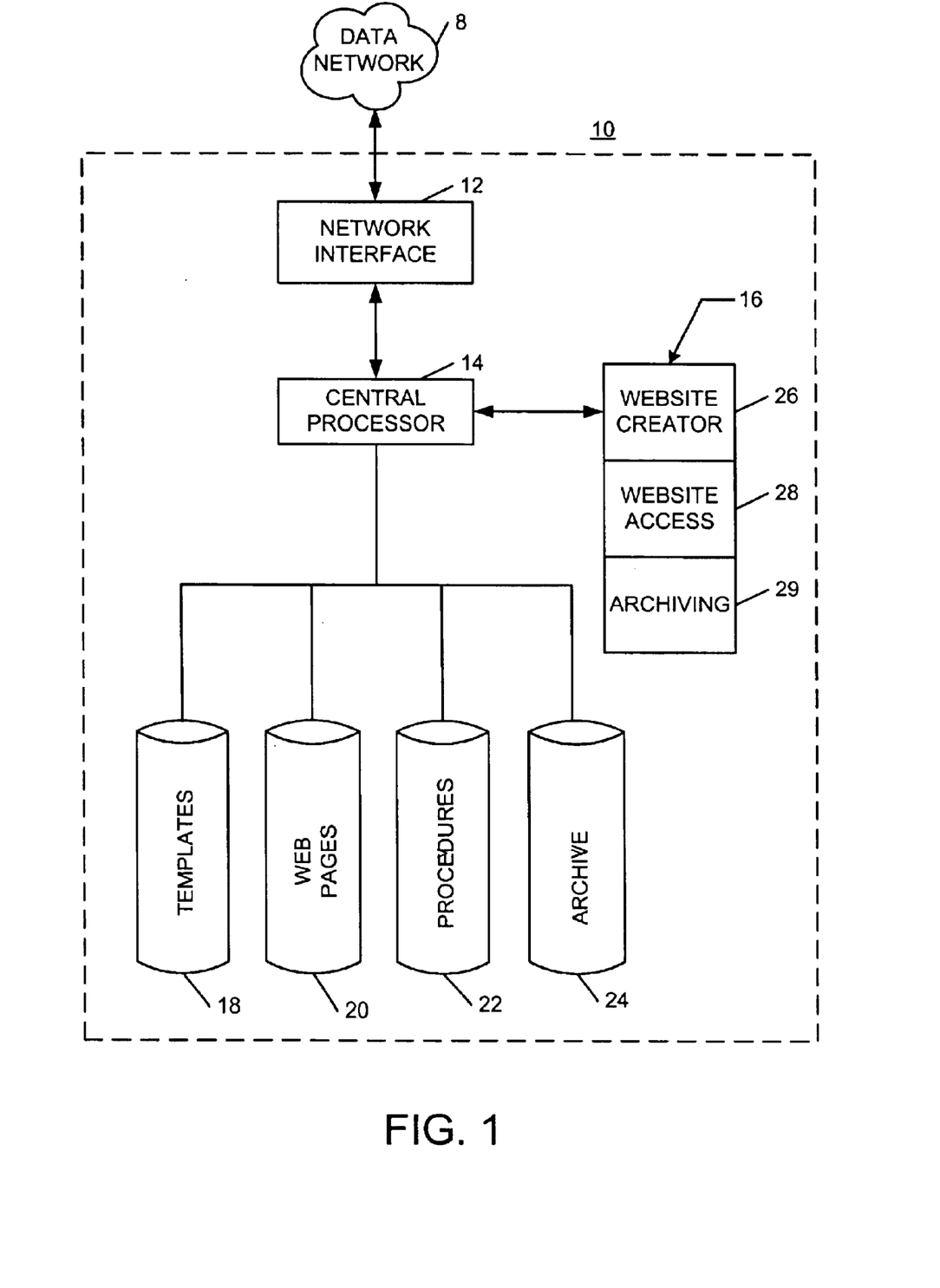
FIG. 1 discloses a system diagram for the community of practice server.

Disclosed in FIG. 1 is a system diagram which includes the components for the community of practice server described herein. The server 10 may be implemented as a Unix or NT server with a connection to a data network 8 such as the Internet or a company or organization's intranet or extranet. In most situations, the system users for the community of practice server will access the server using a personal computer which connectable to the data network 8.

In order to connect to the data network, the server 10 includes a network interface 12. This interface provides for the receipt and transmission of data signals for the data network. In connection with the network interface 12 is the central processor 14. The central processor 14 provides for directing operations of the server 10 and the routing of data signals within, and to and from the server.

In connection with the central processor 14 are a number of databases. These databases are employed to either store data entered by a system user when accessing the community of practice server or provide information necessary in constructing websites. As an example, in database 18 are the templates employed by the system in order to construct the websites. Existing web pages as well as any additional information needed in order to construct web pages may be stored in database 20. Web pages which have been archived due to non-use may be archived in database 22. Finally, if a web page is to include automated procedures, information relating to these procedures may be stored in database 24.

Also connected to central processor 14 is random access memory (RAM) 16. Stored in RAM are the various processing modules which the server employs in order to provide the necessary functions. In particular, a web page creator module 26 is employed to create the web pages when directed by a system user. Other processing modules may include website access module 28, which provides access to currently existing websites, and website archiving module 29, which archives websites not in use and reactivates archived websites upon command.

The community of practice server described herein provides a system which may be employed to support a number of different community of practices. A community of practice may be defined as group of individuals who come together to form a community on the basis of a specific topic (e.g., the Java programming language, sports cars, botany, etc.). The community of practice server described herein is directed at providing websites which are easily created and which provide information and other interactive functions in a common format. In the past, many websites created by such a function were disproportionately one-way (author to reader) and the sites did not provide the necessary functionality needed to make a site like that work. As such, a large number of dead sites (i.e., sites that are no longer maintained) and dead links (i.e., links where the destination page or server has vanished) exist on the Internet, leading to a "noisy" information space.

As such, the system described herein provides the ability for members of a particular practice group to create and contribute directly to a community. The web master is eliminated as an editor and site content is emphasized over site design. Through such a community of practice web site, community members have access to the websites created and can provide any additional information and updates as they see necessary.

Figure 2:
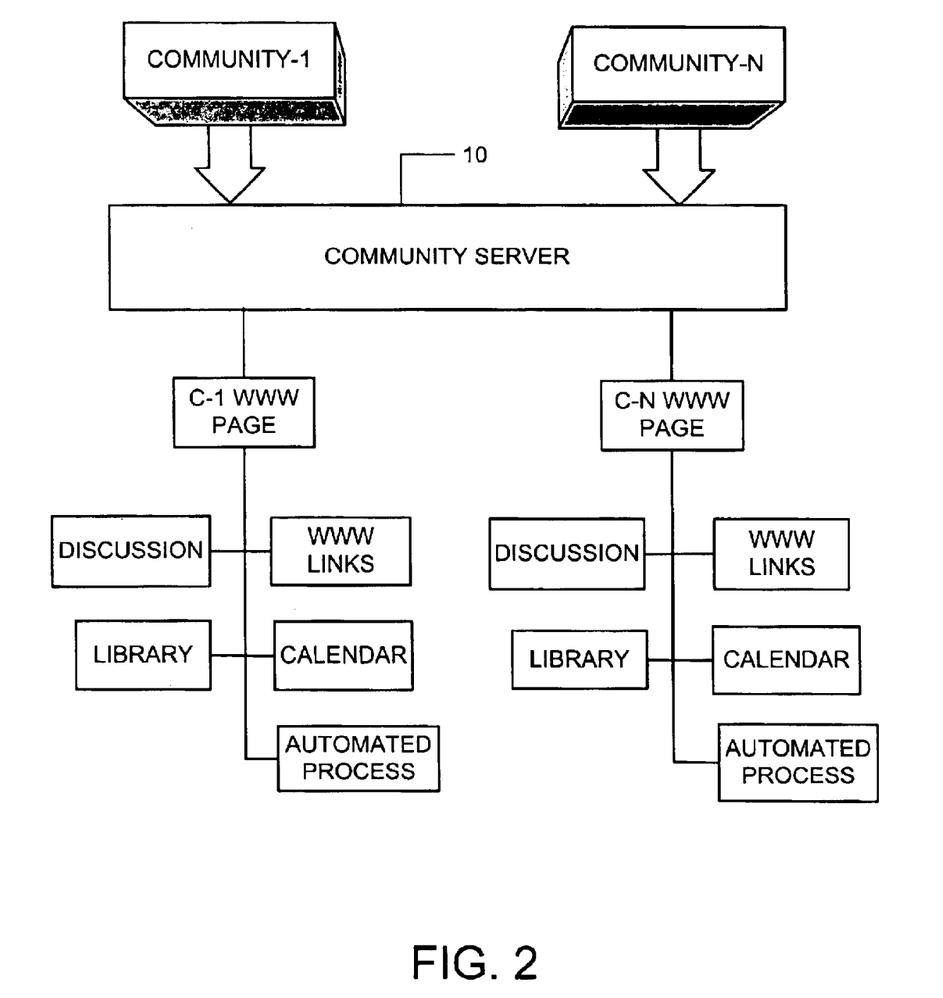
FIG. 2 discloses a organizational diagram for the web pages stored in memory.

Through use of the automated functions described herein, the community of practice server is employed to automatically generate any number of websites for community groups. Websites generated by the system described herein, have the same or substantially the same format, where the differences in the websites are due to the content provided by the system users. Disclosed in FIG. 2 is an organization diagram for the websites located on the server. As can be seen, 1 through n websites are located on the server. In the example shown, each website includes at least six web pages. These pages may include a home page, a discussion page, a links page, a library page, a calendar page, and an automated processes page. While this is just one configuration of an automatically-generated web page, one skilled in the art would realize that there are a number of ways a website may be designed.

As was described above, the community server provides a number of functions for system users with regards to the automatic generation of websites, and the accessing websites located on the therein. In order to employ the system described herein, a system user initially establishes a connection with the community server over the data network. Once a connection has been established, a screen display 30 such as that disclosed in FIG. 3 may be presented.

Figure 3:
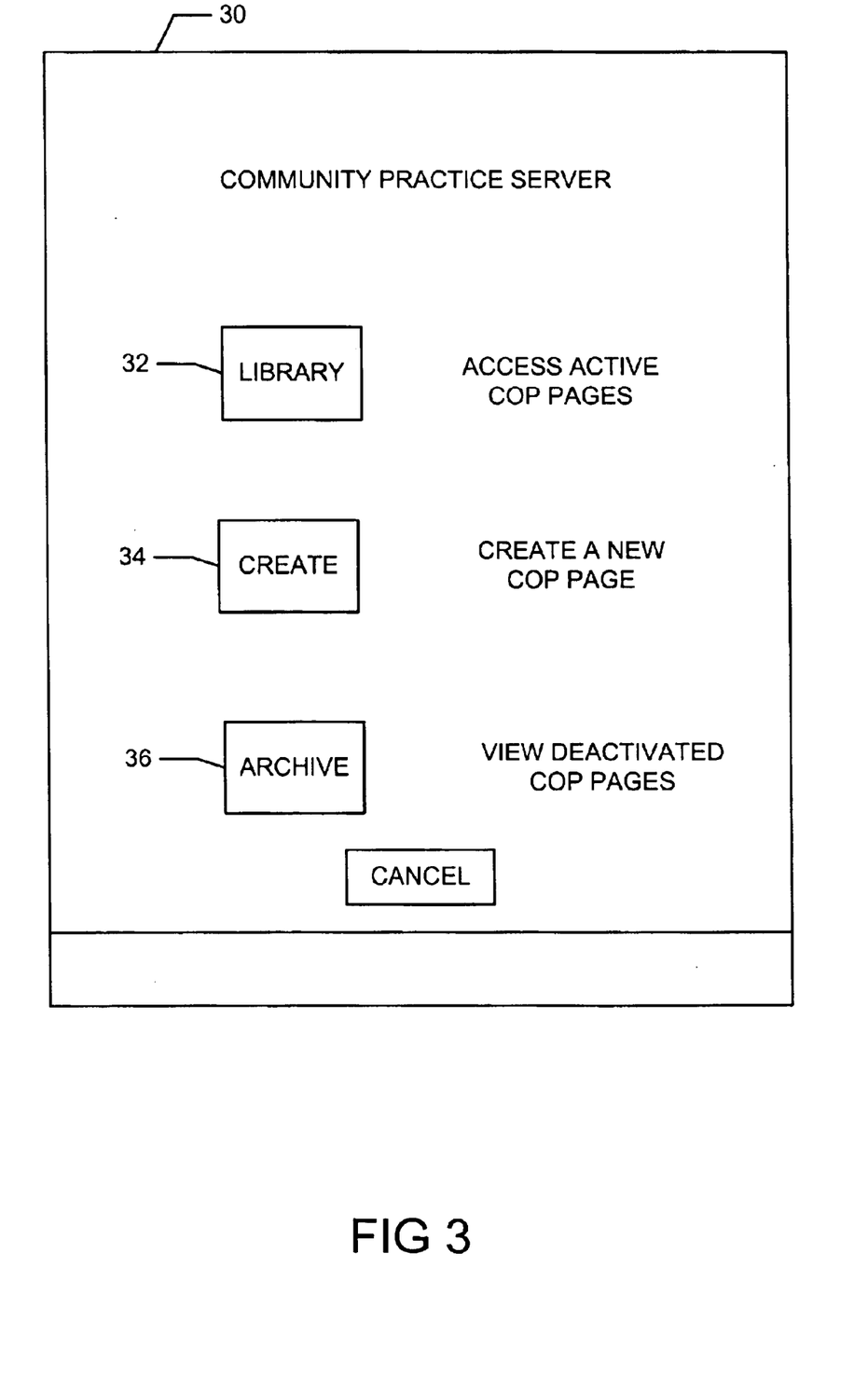
FIG. 3 discloses an interface through which a system user may choose a mode of operation.

Included in screen display 30, may be number of interactive buttons which are selectable to initiate various system functions. Active button 32, when selected, provides for the presentation of a listing community of practice websites which are currently active. When a listing is selected, access to the website is provided. The create button 34, when selected, provides for the creation of a new website for a community of practice. The process for creating the website will be described in greater detail below. Finally, the archive button 36, when selected, directs the system user to a process for viewing and selecting websites which have been archived such that they may be reactivated and used further.

Figure 4:
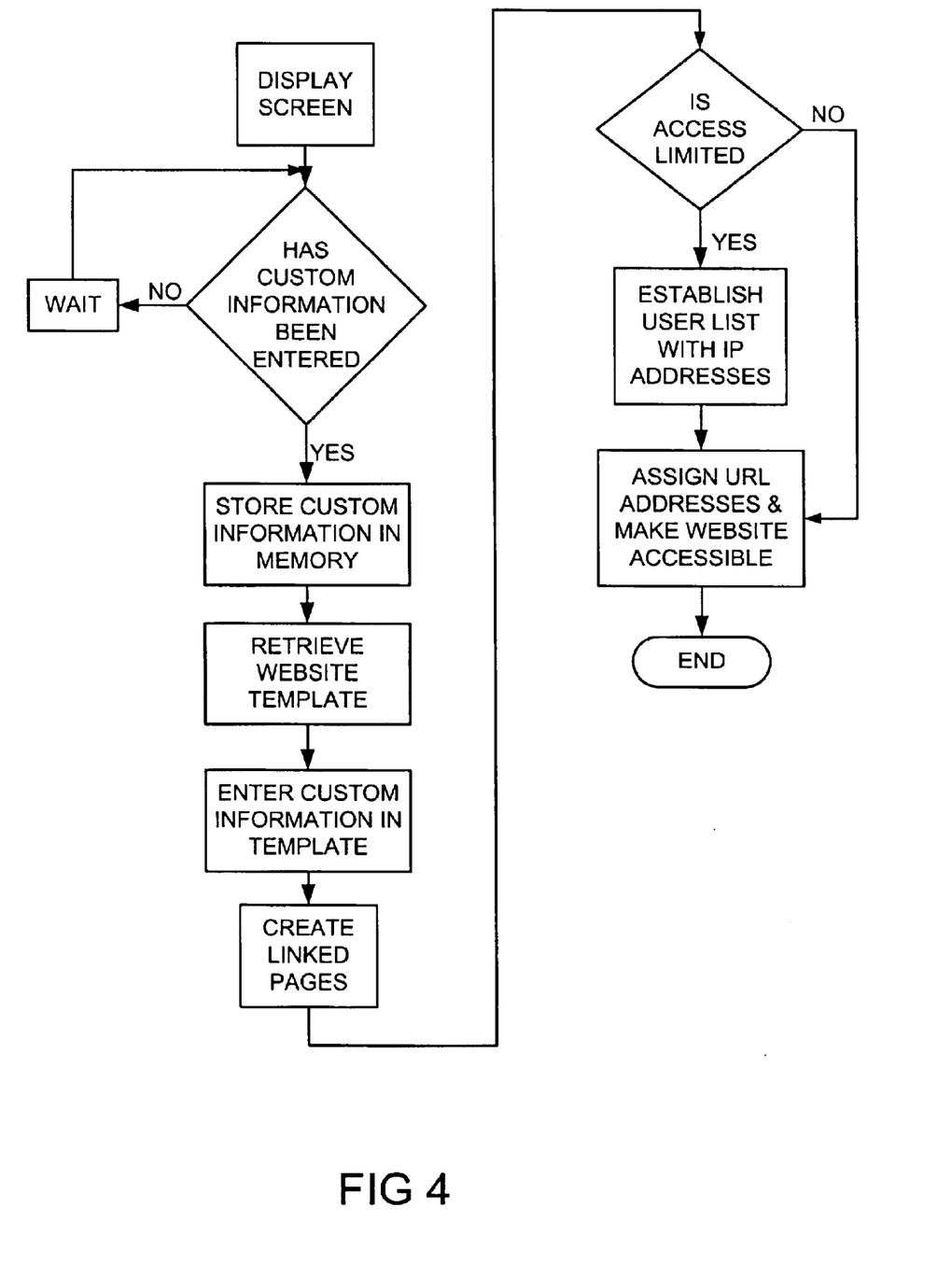
FIG. 4 discloses a flowchart which describes the automatic website generation process.
Figure 5:
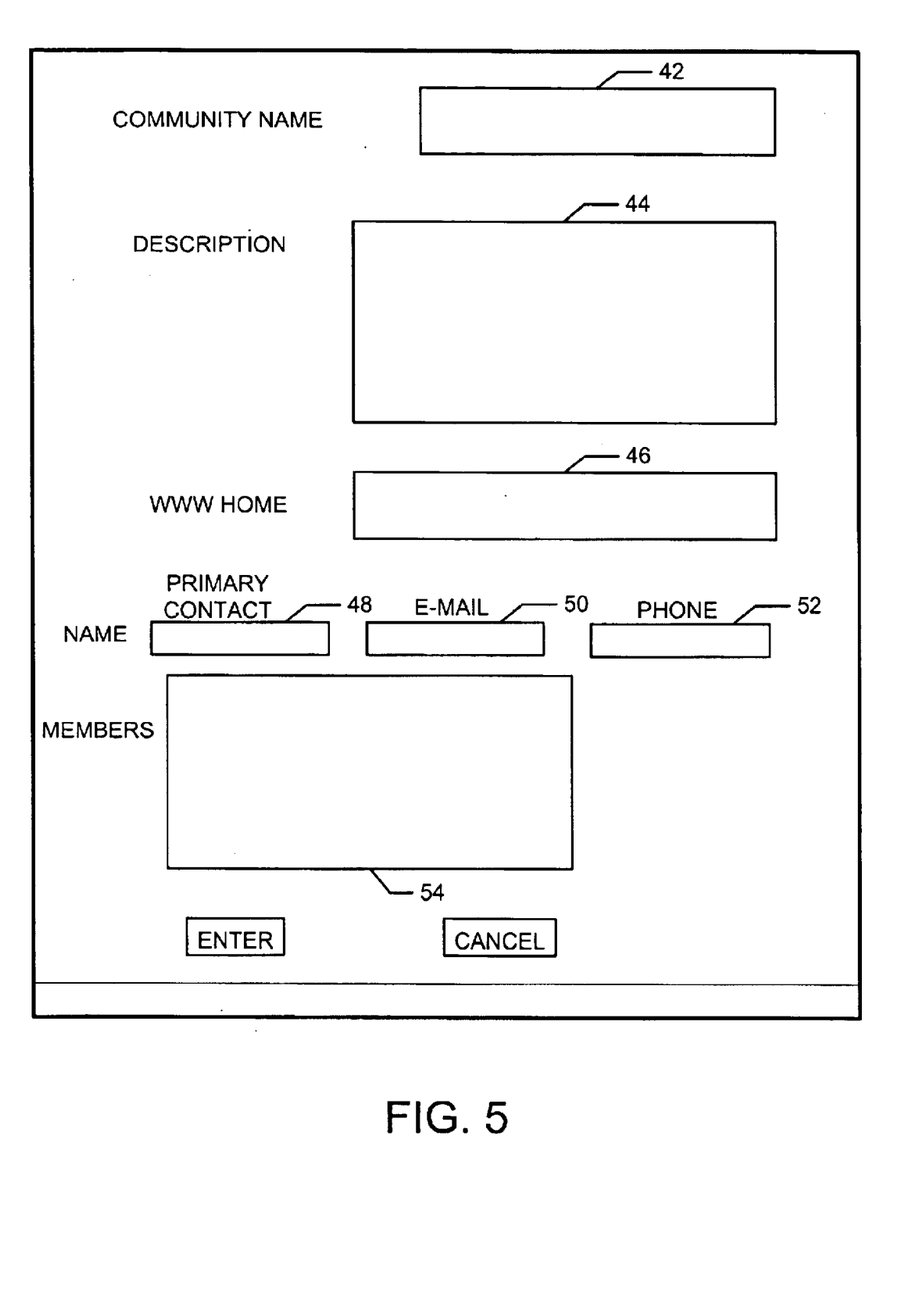
FIG. 5 discloses an interface through which a system user may enter information to populate a website.

In a situation where the system user chooses the create button 34 the system begins performing a number steps which are detailed in the flow chart of FIG. 4. After selection, a screen display 40, such as the one shown in FIG. 5, is presented to the system user. Included in this screen display are a number of dialog boxes through which a system user may enter information in order to create a web page. In the screen display, a dialog box 42 is included for entering a community name. This entry can be used as a title for the website which is searchable when the website is activated. Also included is a description dialog box 44 wherein a description of the practice group as well as any other relevant information may be entered. This may also be used for entering metadata or other identifying information for the website.

In dialog box 46, a desired URL address is automatically generated. In dialog boxes 48 through 52, personal information for the person creating the website may be entered and then through dialog box 54, if access to the website is to be limited, names of the authorized parties as well as their IP addresses may be entered, such that these restrictions may be implemented.

Returning again to FIG. 4, once the information is entered, it may be temporarily stored in memory while the website is constructed. As was mentioned above, stored in the databases are at least one template which may be employed in conjunction with the entered information to create a website. Once the system user has entered the information in, the designated website template may be retrieved from memory and the information provided by the system user entered in the appropriate places.

At this point the templates for the discussion, calendar and events, library, and automated processes pages may be accessed from memory, created using the information provided, and then linked to the home page for the new website. A final query may then be made as to whether the site will be limited access. If so, the necessary restrictions will be incorporated into the website to limit access. At this point, a URL address is assigned and the website is made accessible over the data network.

Figure 6:
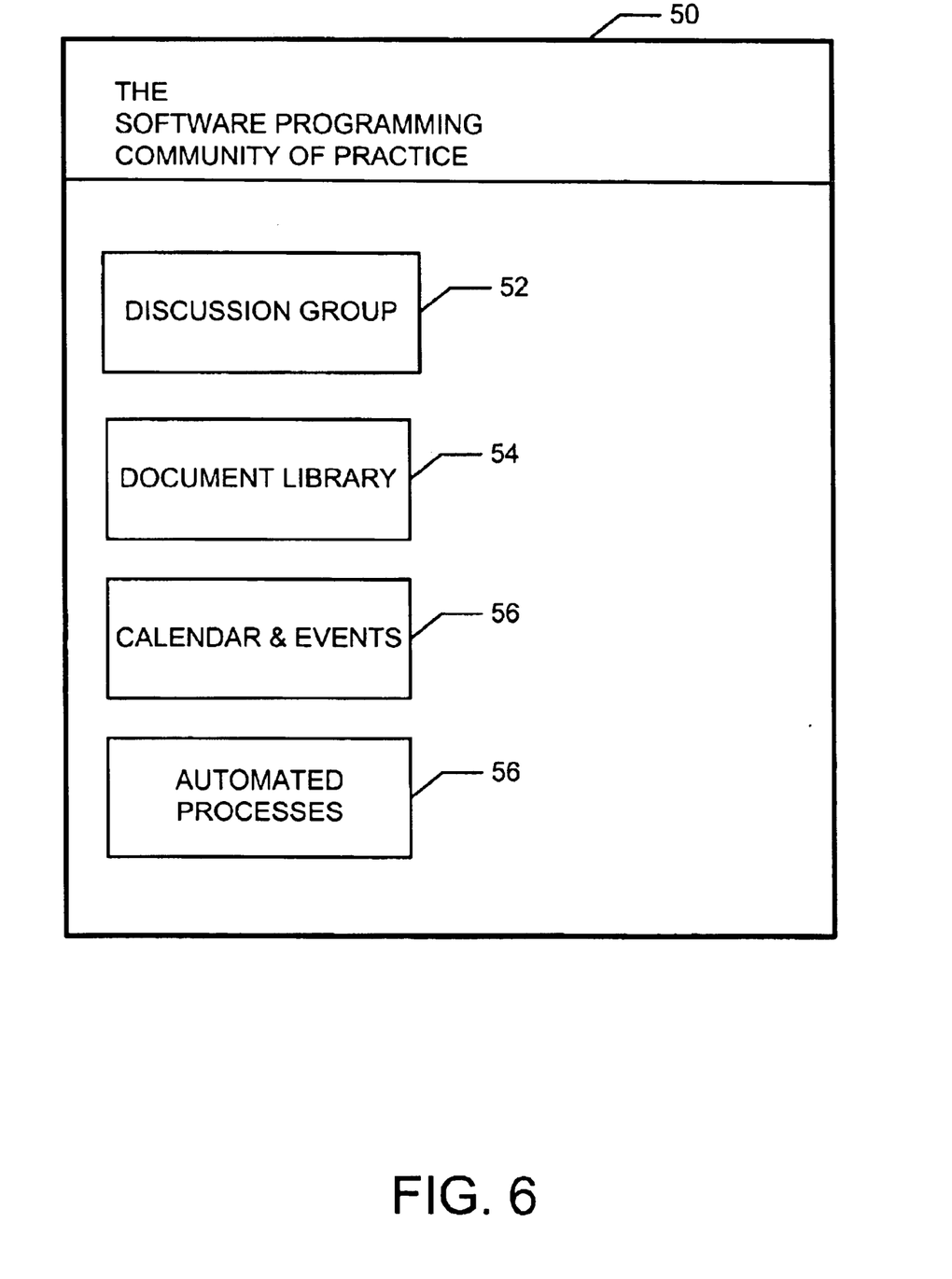
FIG. 6 discloses a home page for a website which is created by the system disclosed herein.

Disclosed in FIG. 6, is a screen display 50 for a home page of a website created by the automated process described above. As can be seen, this web page includes a title, as well as hypertext links for connecting to other areas of the website. In particular, hypertext link 52 is selectable to establish a connection with a discussion page, hypertext link 54 is selectable to establish a connection with the document library page, hypertext link 56 is selectable to establish a connection with a calendar and events page, and link 58 is selectable to establish a connection with the automated processes page. The pages accessed may also include various screen displays and interactive buttons or dialog boxes which the system users may select to perform any number of additional functions.

In particular, the discussion page may provide a forum for members of the community of practice to exchange messages, hold discussion, and post information which may be of interest to others. The discussion page includes functionality to facilitate electronic, asynchronous discussion. The document library may be a repository of documents which have been made accessible by parties who have access to the website. Included in this page may be the functionality to view a listing documents, access and view documents, add documents to the library, and delete documents in the library.

The calendar and events page may provide a listing of events which the parties with access to the page may view, add to, update, or delete. The automated process page may include a number of interfaces for initiating automated processes which are resident on the server. When a particular automated process is activated a sequence of screen displays retrieved from memory may be presented to the system user. Included in the screen displays may be dialog boxes through which system users may enter information to be used in performing the selected process.

Figure 7:
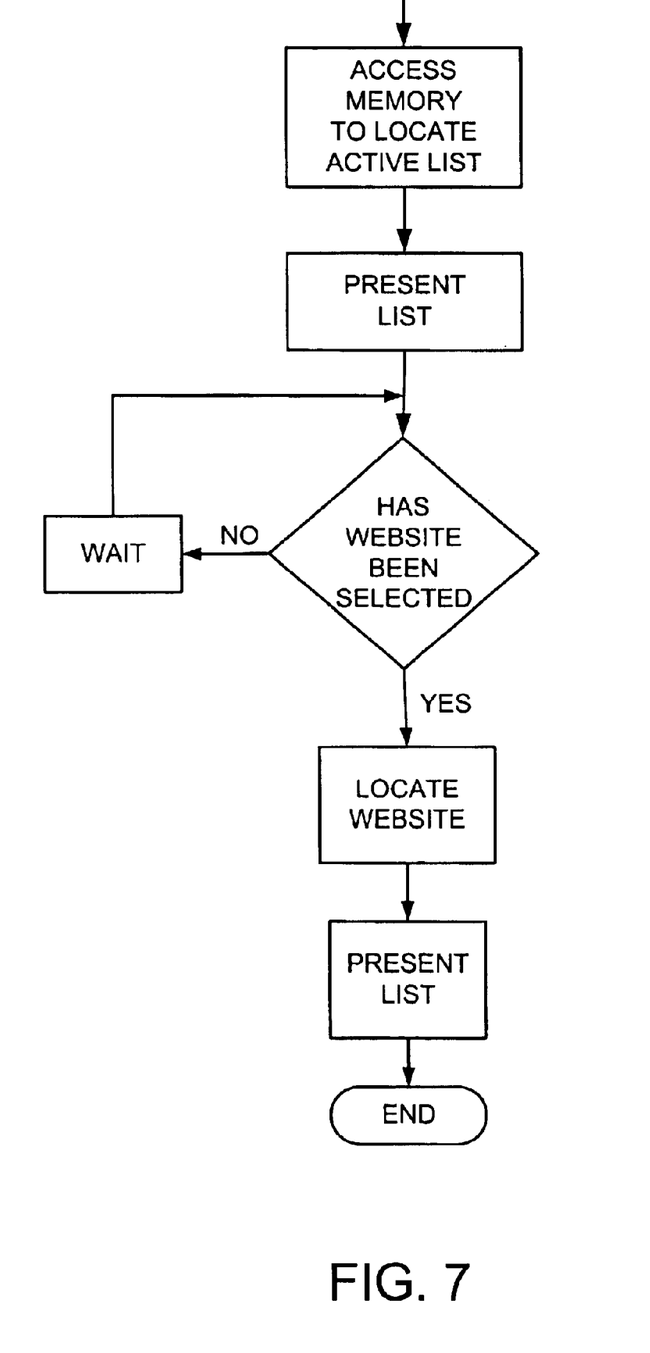
FIG. 7 discloses a flow chart which describes the accessing and presentation of active websites.
Figure 8:
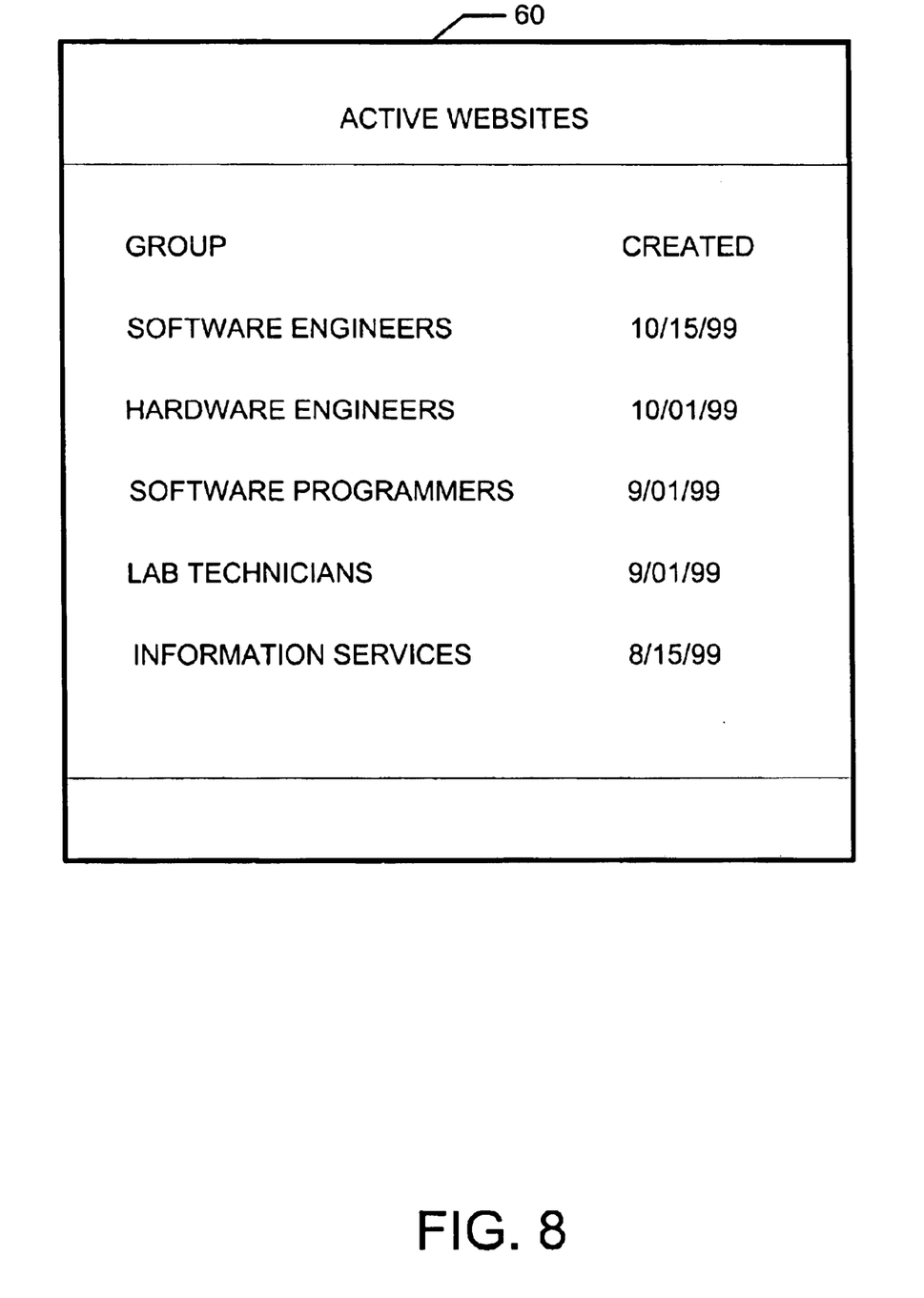
FIG. 8 discloses an example of a web page which provides a listing of active websites.

Returning again to FIG. 3, if the system user decides to view the current listing of active web pages, the interactive button 32 is selected. Once this selection is made, the system performs the steps disclosed in the flow chart of FIG. 7. As a first step, the system accesses its memory to locate the listing of active community of practice websites. Once the list is located the screen display 60 disclosed in FIG. 8 is presented. Included in this screen display 60 is a listing of all of the active web sites. The option is provided to manually browse through the listed sites or to perform a topical or alphanumeric search of the websites to locate particular one. Once the website is located, it may be selected and the home page presented.

Returning once again to FIG. 3, the system user further has the option of choosing archive button 36 in order to view websites which have been deactivated due to non-use. The system may be programmed such that each website is periodically monitored, and if the site is not used over a predetermined period of time, it is removed from active status and placed in an archive. As such, it will not appear in any searches which are performed of the intranet in order to locate relevant websites.

Figure 9:
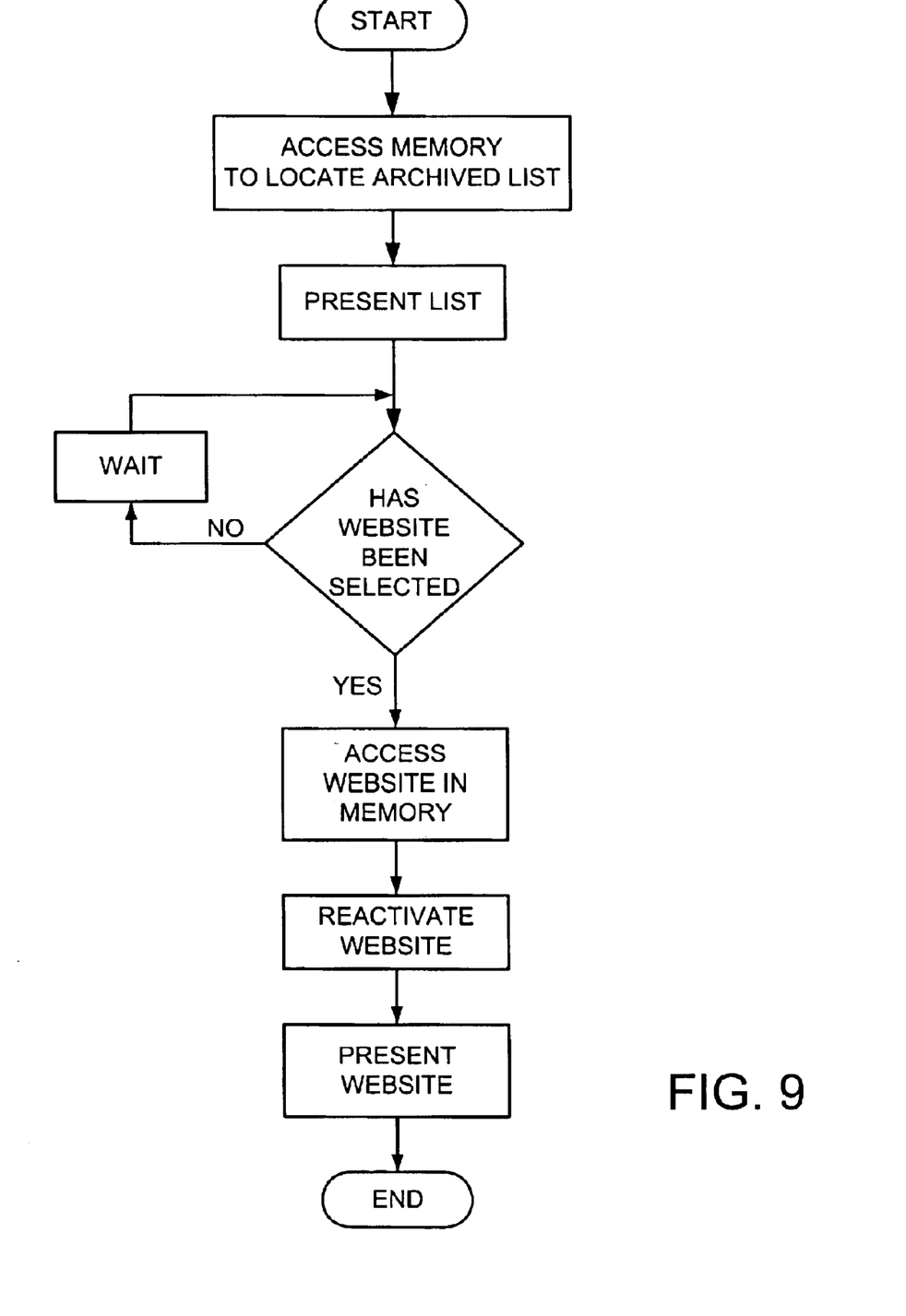
FIG. 9 discloses a flow chart which describes the accessing and presentation of archived websites.
Figure 10:
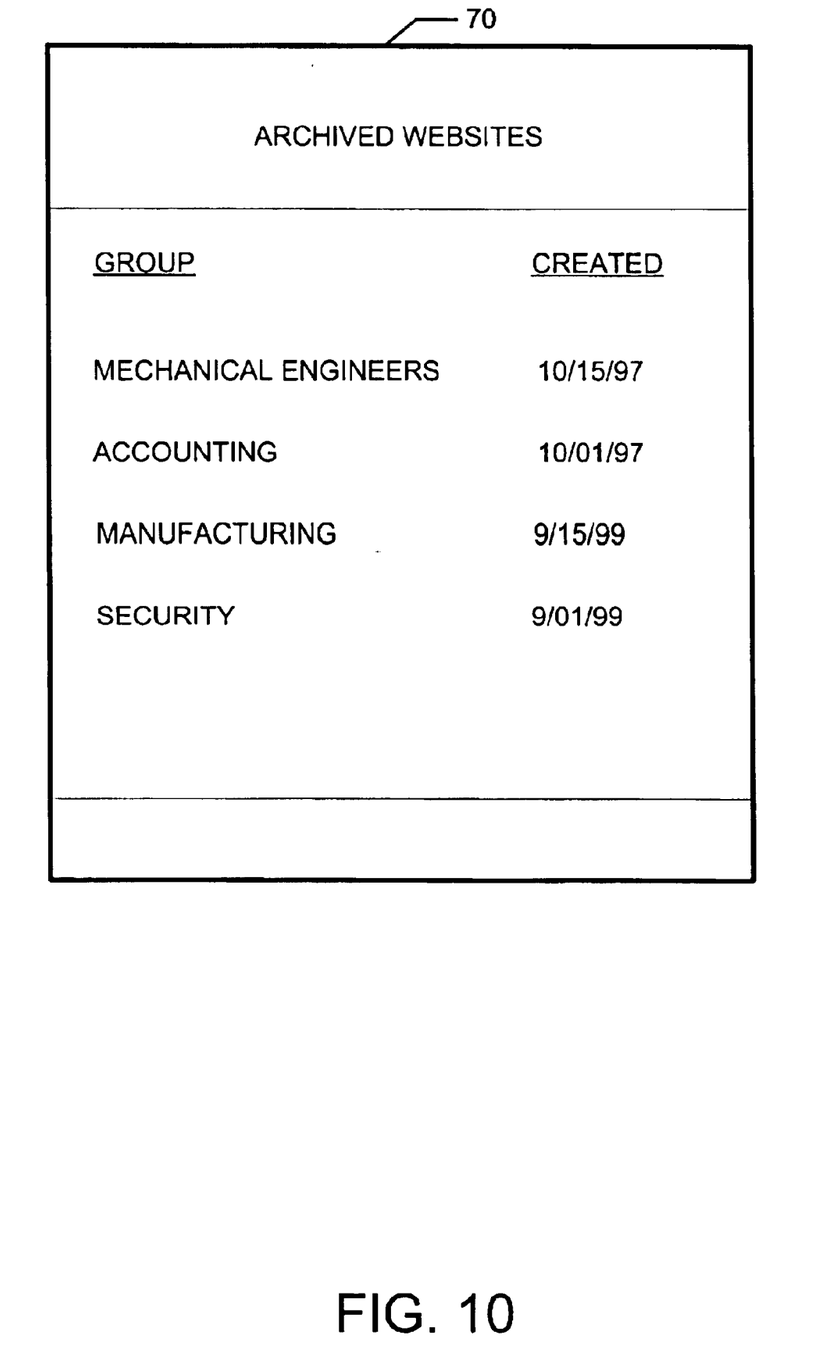
FIG. 10 discloses an example of a web page which provides a listing of archived websites.

If the system user does choose the interactive button 36 the system will perform the steps disclosed in the flow chart of FIG. 9. After the button is selected, the system will perform a search of memory to locate a listing of all archived websites. Once located the listing is presented in screen display 70 as shown in FIG. 10. Through listing shown in screen display 70, the system user may browse through the inactive websites using the dialog box 72. Additionally, the system user may perform a topical or alphanumeric search of websites to locate a particular one. When a site is located, it may be selected and reactivated. The contents of the website may then be accessed over the data network.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system for generating community of practice websites, comprising:

an interface accessible over a data network configurable to receive custom information for creating the community of practice websites;

a first database which includes at least one template for generating the community of practice websites, wherein each of the community of practice web sites is of a standardized format including a plurality of automatically linked web pages;

a website generation apparatus for entering the custom information into the at least one template to generate the community of practice websites, where the apparatus further stores the community of practice websites in a second database and a website access module configured to generate and present one or more listings of all the community of practice websites including status information for each of the community of practice websites, wherein access is provided to one or more of the community of practice websites upon selection from the one or more listings.

2. The system of claim 1 wherein each of the standardized community of practice websites include a homepage which has at least one hypertext link, and at least one of the automatically linked additional web pages, wherein the at least one automatically linked web pages is accessible through selection of the at least one hypertext link and the custom information is used to construct at least one of the automatically linked web pages.

3. The system of claim 2 wherein the at least one automatically linked web page includes at least one of:

a discussion page which includes functionality to facilitate electronic discussion;

a library page which includes links to a repository of electronic documents, wherein facilities are provided to download documents to said repository;

an events page which includes a listing of events; and a calendar page.

4. The system of claim 3 wherein the library web page includes links to electronic documents stored in a library.

5. The system of claim 1, wherein the community of practice websites are configurable to limit access only to selected parties.

6. The system of claim 1 wherein the data network comprises at least one of:

the Internet; and an intranet.

7. The system of claim 1 further including an archiving module which is configured to monitor access to the commmunity of practice websites and to archive any of community of practice websites which are not accessed within a predetermined period of time.

8. A community of practice server comprising:

a first screen display accessible which facilitates communication between the server and a data network;

central processor in connection with the interface which provides for routing of data signals within the server;

a first memory accessible by the central processor which includes a plurality of websites accessible over the data network, and a listing of the websites stored in the first memory;

a second memory which includes at least one template for a website which may be populated with custom information received over the data network;

a website creation module in connection with the central processor which is configured to create websites using the at least one template and the custom information received over the data network, the website creation module being further configured to store the created websites in the first memory; and a website access module configured to present the listing of the websites in the first memory and to provide access to the websites upon selection from the listing;

said first screen display further configured to provide for at least one of: automatically generating a new website which is configured in a standardized format which includes a homepage and at least one automatically linked page, and viewing the listing of websites.

9. The server of claim 8 further comprising a second screen display for entry of custom information for the automatic generation of a website.

10. The server of claim 8 wherein the listing includes at least one of:

active websites; and archived websites.

11. The server of claim 10 further including an archiving processing module which monitors usage of the websites resident on the website and automatically deactivates selected websites after a predetermined period of non-use.

12. The server of claim 11 wherein the archiving processing module is further configured to reactivate the selected websites upon selection from the listing.

13. The server of claim 10 wherein the new websites includes a home page which includes hypertext links to at least one other page associated with the new websites and at least one of:

a discussion page which includes functionality to facilitate electronic discussion;

a library page which includes links to a repository of electronic documents, wherein facilities are provided to download documents to said repository;

an events page which includes a listing of events; and a calendar page.

14. The community of practice server of claim 8 further comprising an archiving module configured to archive active websites on the server which are not accessed after a predetermined of time, the archiving module being further configured to provide a listing of archived wed sites upon request.

15. A method for creating and providing access to a community web site on a web based server comprising the steps of:

presenting an interface accessible over a data network configured for receiving data from a system user;

receiving information from a system user employable to construct the web site, identifying information and storing the system user information in memory;

accessing a database which includes a common template for creating a standardized website, wherein the website includes a home page and at least one automatically linked page;

retrieving the common template and the system user information from memory;

inserting the system user information in designated places in the at least one template to create the website, wherein creating the website includes assigning a URL address and making said website accessible over the data network;

storing the website in memory with at least one other active website;

including the website in a listing of the active websites which are accessible on the web based server; and presenting the website for review upon selection by a system user accessing the web based server.

16. The method of claim 15 wherein the user information includes at least one of: community name, community description, URL address, primary contact information, authorized users.

17. The method of claim 15 further including the step of automatically generating at least one additional web page wherein a hypertext link is provided on the home page such that the at least one additional web page may be accessed over the data network.

18. The method of claim 17 wherein the at least one additional web page includes at least one of: a links page, a library, a forum page, an automated process page, and a calendar page.

19. The method of claim 15 further including the step of presenting an initial screen display accessible over the data network, wherein the initial screen display includes at least one of: a page creator interface to initiate the process for creating the web page, an access interface to view currently active community of practice web pages, and archive interface to access the community of web pages which have been archived.

20. The method of claim 15 further comprising the step of archiving the wedsite upon determining that the wedsite has not been accessed within a predetermined period of time.

* * * * *